INVENTOR.
ROBERT E. RAYMOND
BY
Schmieding & Fultz
ATTORNEYS

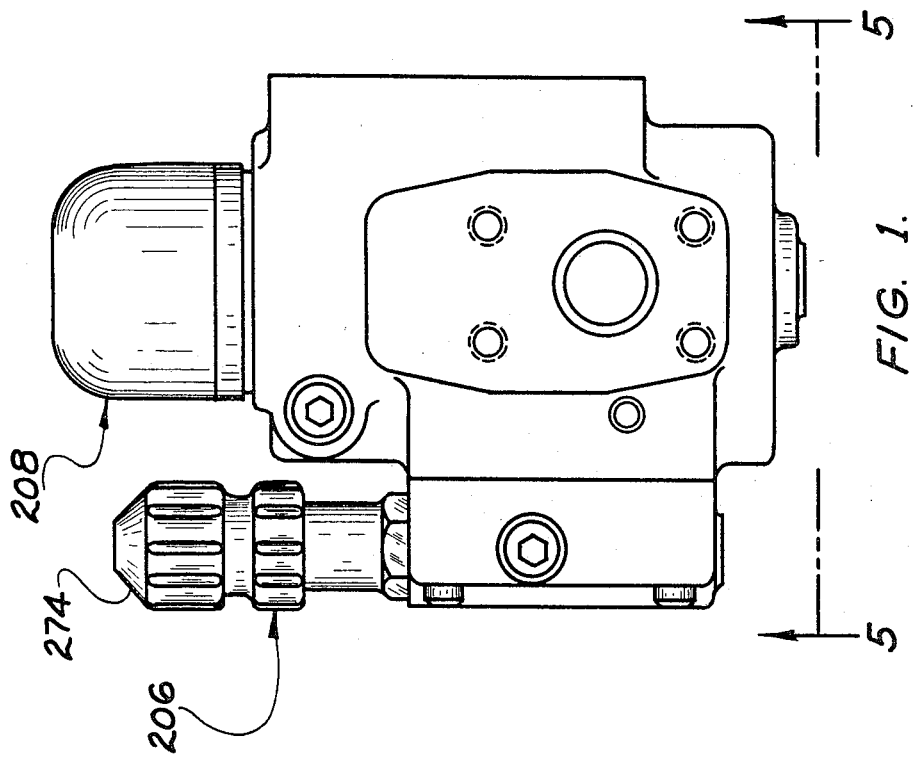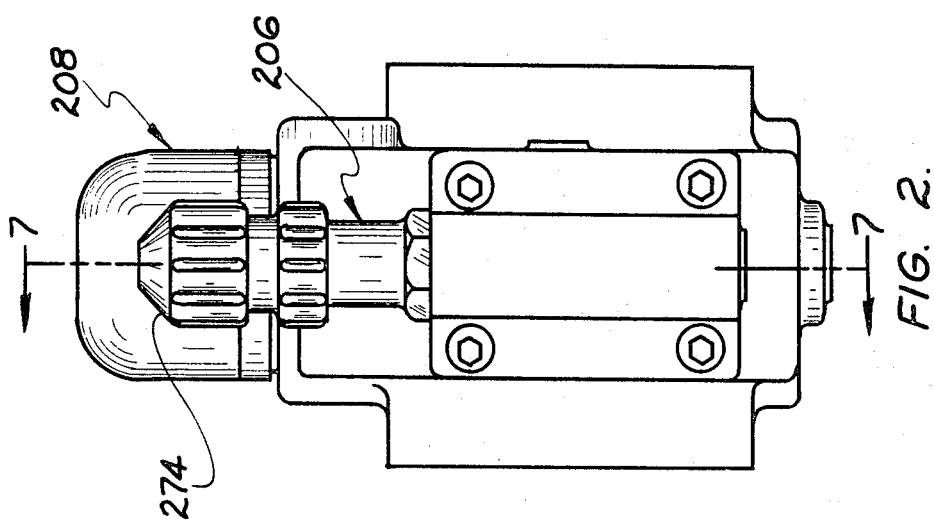

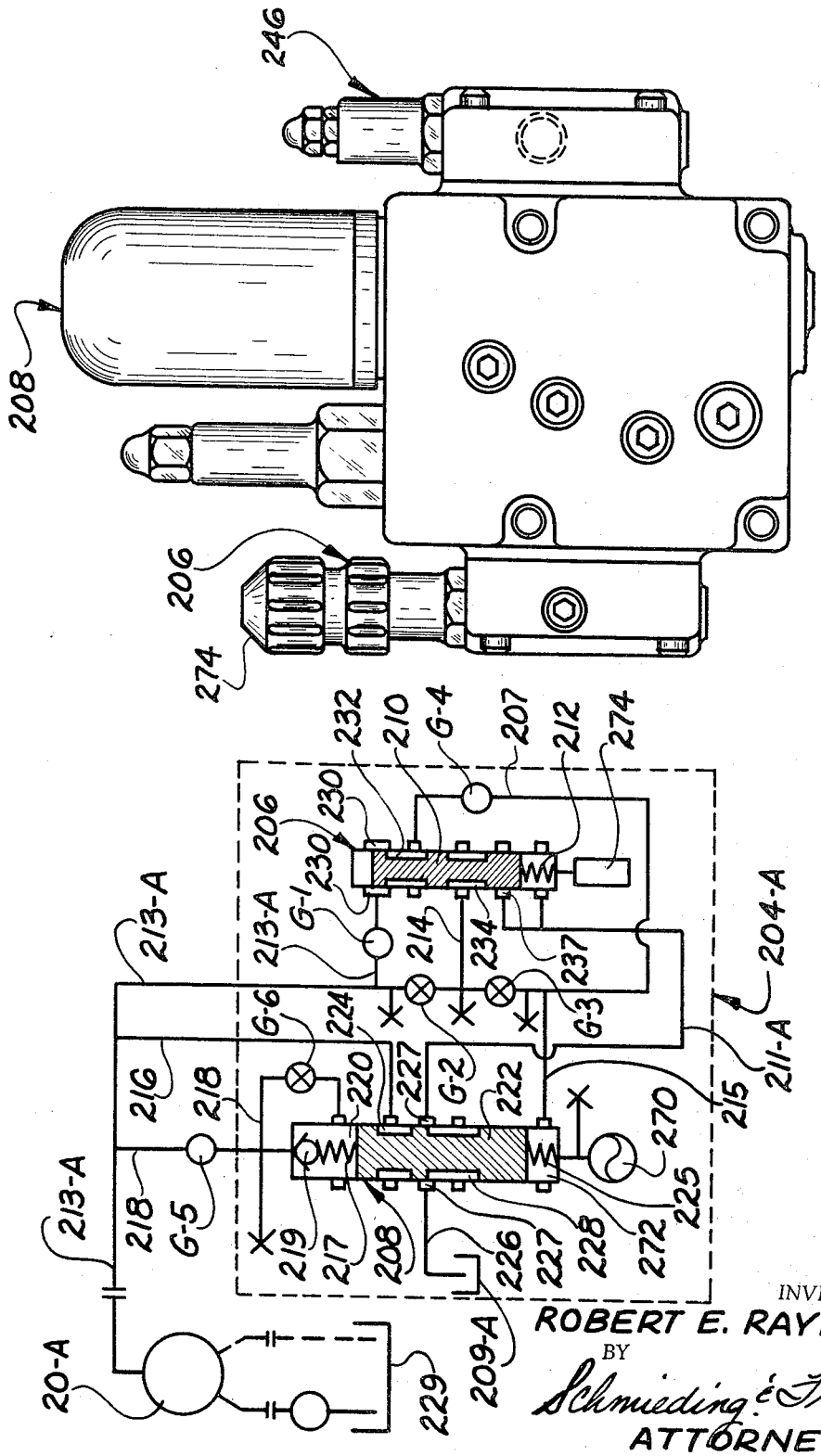

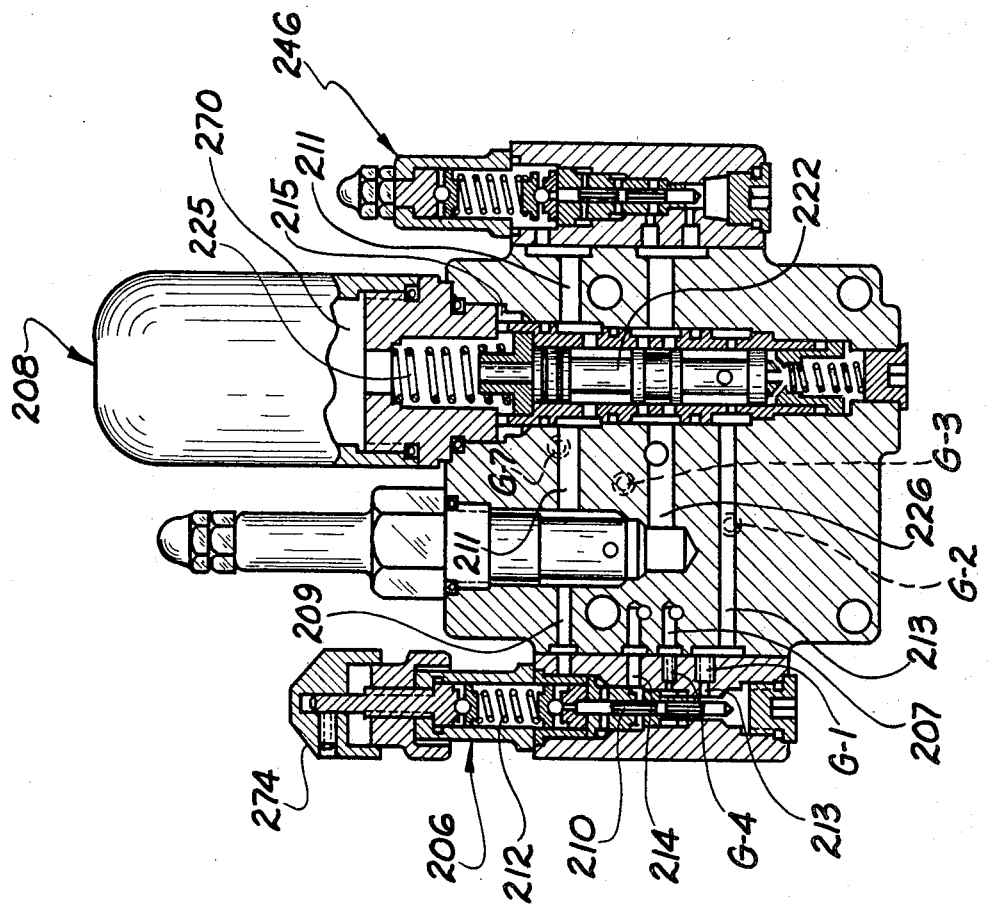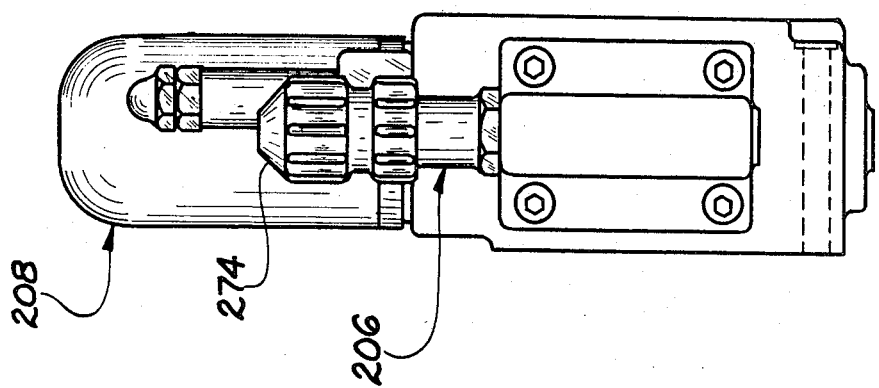

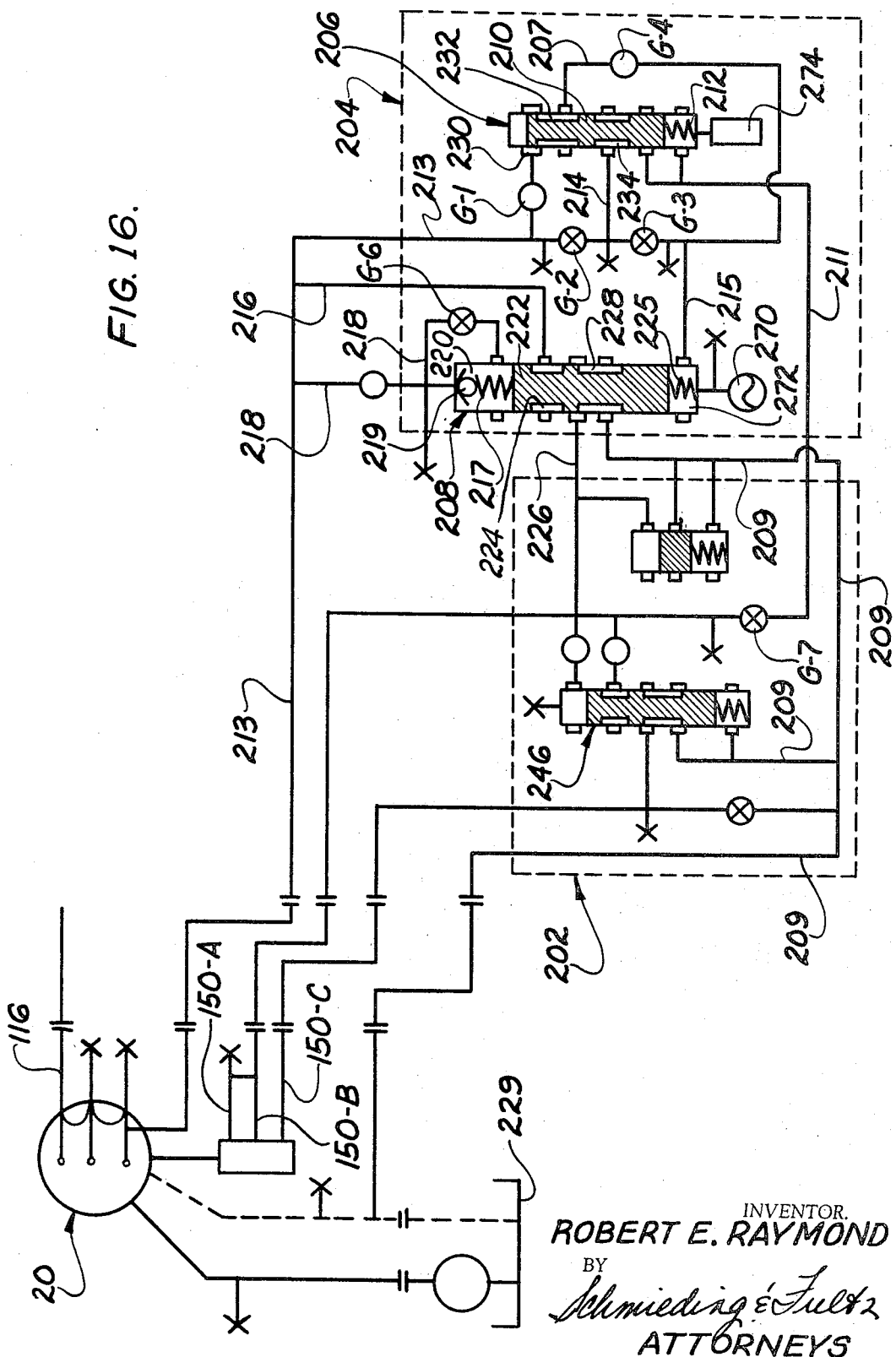

United States Patent Office 3,429,337
Patented Feb. 25, 1969

3,429,337
PRESSURE CONTROL APPARATUS
Robert E. Raymond, Zanesville, Ohio, assignor to International Basic Economy Corporation, New York, N.Y., a corporation of New York
Filed Dec. 29, 1966, Ser. No. 605,724
U.S. Cl. 137—488     8 Claims
Int. Cl. F16k 31/12, 31/36

ABSTRACT OF THE DISCLOSURE

A pressure control apparatus that includes a power control valve element and associated detector valve means the latter serving to automatically control the sensitivity of the power valve means is non-sensitive to rates of change of pressure below a predetermined pressure value, and then highly sensitive to rates of change of pressure to be controlled as the pressure approaches the predetermined pressure value. The apparatus includes additional control elements that provide a high degree of control accuracy by eliminating overshoot and shock effects on the components of the apparatus.

---

The present invention relates generally to hydraulic control apparatus and particularly to a novel pressure control apparatus.

In general, the pressure control apparatus of the present invention comprises a detector valve which communicates with a source of pressurized fluid and which draws a first flow of fluid through a restricting means responsive to a predetermined fluid pressure resulting in a pressure drop across the restricting means and a power valve which communicates with asid detector valve. The power valve includes a capacitive or resilient feature which permits the power valve to react quickly to changes in the pressure which is controlled. However, the pressure control apparatus of the present invention also includes what is referred to herein as a "dual gain" feature which automatically controls the responsiveness of the power valve. This dual gain feature permits the power valve to be non-sensitive to rates of change of pressure below a predetermined pressure value and then automatically permits the power valve to be rapidly responsive and highly sensitive to rates of change of the pressure to be controlled as this pressure approaches this predetermined pressure value.

Prior art pressure control techniques conventionally have used a pilot operated detector element that controls a main power element and generally there is always an orifice throttling situation or its equivalent present. In this type of straight forward pilot control, the detector element functions to draw a control flow which creates a pressure drop across an orifice or its equivalent. This pressure drop is reflected across the spool or poppet elements of the main power valve and actuates the power valve. Further, these conventional pressure control techniques usually detect a secondary pressure such as the pressure on the other side of a control orifice instead of directly measuring the primary pressure which is the main pressure to be controlled.

The main power valve element in the prior art control apparatus are inherently relatively stiff. In other words the spool or poppet elements will move under relatively slow changing pressure conditions responsive to the pressure differential across the spool or poppet. However, such conventional power elements do not have the ability to open or close quickly responsive to high rates of change in the pressure to be controlled without introducing highly unstable characteristics to the valve.

In prior control apparatus it is generally true that the more accuracy desired requires a more oscillatory spool which makes the spool highly unstable.

However, the control apparatus of the present invention permits the power spool to be highly accurate and yet very stable at the set pressure because the power spool moves toward a direction to relieve pressure responsive to a pressure differential proportional to the rate of change of pressure in the system being controlled. This may be termed a rate of pressure change negative derivative feedback circuit.

It is therefore an object of the present invention to provide a pressure control apparatus which permits rapid, sensitive response to high rates of change of pressure during both pressure rising or falling conditions.

It is another object of the present invention to provide a "dual gain" pressure control apparatus which permits the responsiveness of the main power valve element to be controlled whereby the power valve element is rendered non-responsive to rates of change of the controlled pressure under a predetermined pressure value and yet is automatically rendered highly responsive to rates of change in the controlled pressure above said predetermined pressure value.

It is another object of the present invention to provide a pressure control apparatus which is much more stable at the set pressure yet maintains a high degree of accuracy in controlling the pressure in the system.

It is another object of the present invention to provide a pressure control apparatus wherein the primary pressure in the main pressure line is measured directly therefore, the disadvantages of measuring some secondary pressure proportional to the main pressure are eliminated.

It is another object of the present invention to provide a pressure control apparatus wherein the main power element includes a check valve assembly which restricts the spool or poppet element when said element is moved toward a closed position. This check valve feature reduces shock and overshoot on a fast closing valve and dampens the closing action of the spool elements to eliminate high frequency vibration of the spool element which is referred to in the art as "chatter."

It is another object of the present invention to provide a pressure control apparatus wherein the power valve in its preferred form utilizes a volume of oil to act in a capacitive nature to impart sensitivity and more rapid response in the power valve means to high rates of change of pressure. Other advantages of using an oil capacitance such as functioning on a reasonably linear basis, enhancing the simplicity of the valve mechanism, and being directly serviced by the fluid which is being fed into the valve further make it very desirable.

It is still another object of the present invention to provide a pressure control apparatus which is highly versatile and readily adaptable to a variety of field conditions.

Further objects and advantages of the present invention will be apparent from the following description, reference being had to the accompanying drawings wherein preferred forms of embodiments of the invention are clearly shown.

In the drawings:

FIG. 1 is a front elevational view of a preferred embodiment of a control apparatus constructed in accordance with the present invention;

FIG. 2 is a left side elevational view of the control apparatus illustrated in FIG. 1;

FIG. 10 is a diagrammatic view of the apparatus shown in FIG. 1 illustrating schematically the control apparatus of the present invention functioning as a relief valve which is connected to a hydraulic pumping apparatus;

FIG. 11 is a front elevational view of another embodiment of a control apparatus constructed in accordance with the present invention.

FIG. 14 is a right side elevational view of the control apparatus shown in FIG. 11;

FIG. 15 is a front elevational view partially in section of the control apparatus shown in FIG. 11, the section being taken along the centerline of the apparatus shown in FIG. 11;

FIG. 16 is a diagrammatic view of the control apparatus shown in FIG. 11 wherein the control apparatus is schematically illustrated functioning as a pressure governor;

Figure 3:
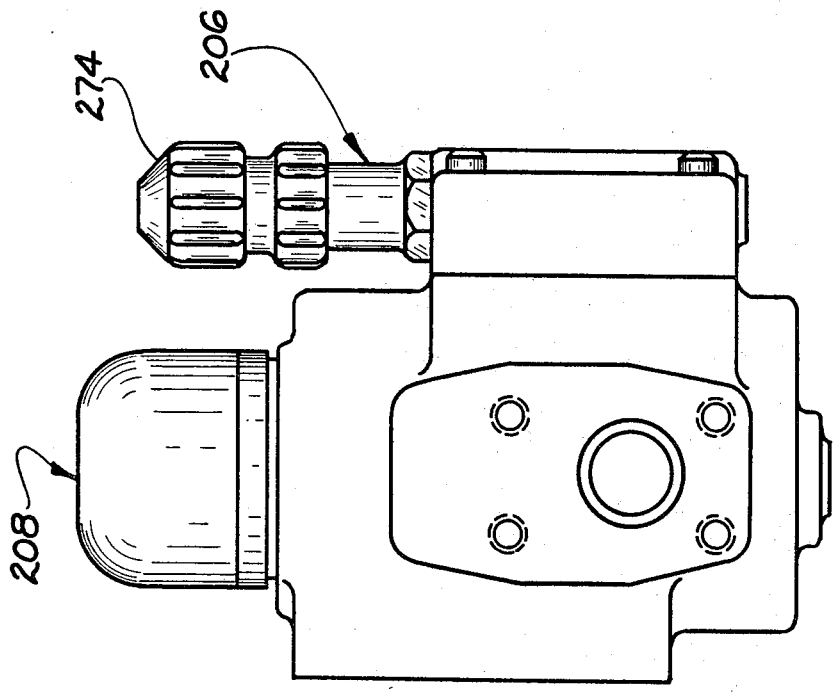
FIG. 3 is a rear elevational view of the control apparatus illustrated in FIG. 1.
Figure 4:
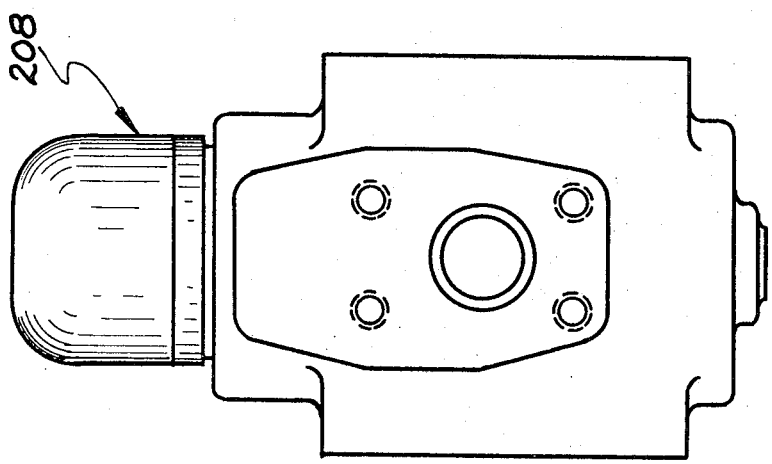
FIG. 4 is a right side elevational view of the control apparatus illustrated in FIG. 1.
Figure 6:
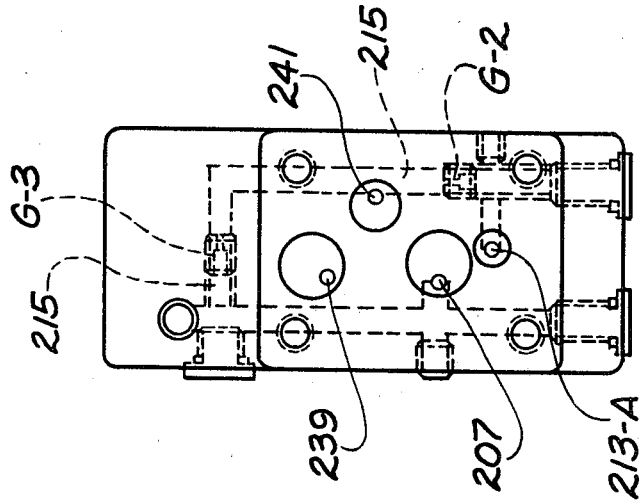
FIG. 6 is a left side sectional view of the apparatus illustrated in FIG. 1, the section being taken along line 6—6 in FIG. 1.
Figure 5:
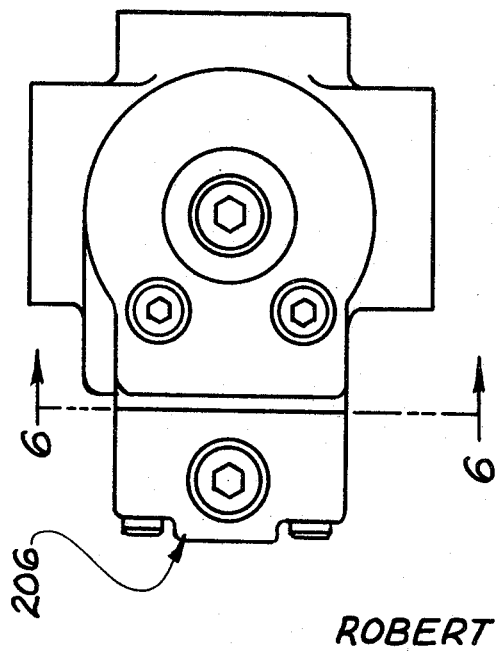
FIG. 5 is a bottom plan view of the apparatus illustrated in FIG. 1.
Figure 7:
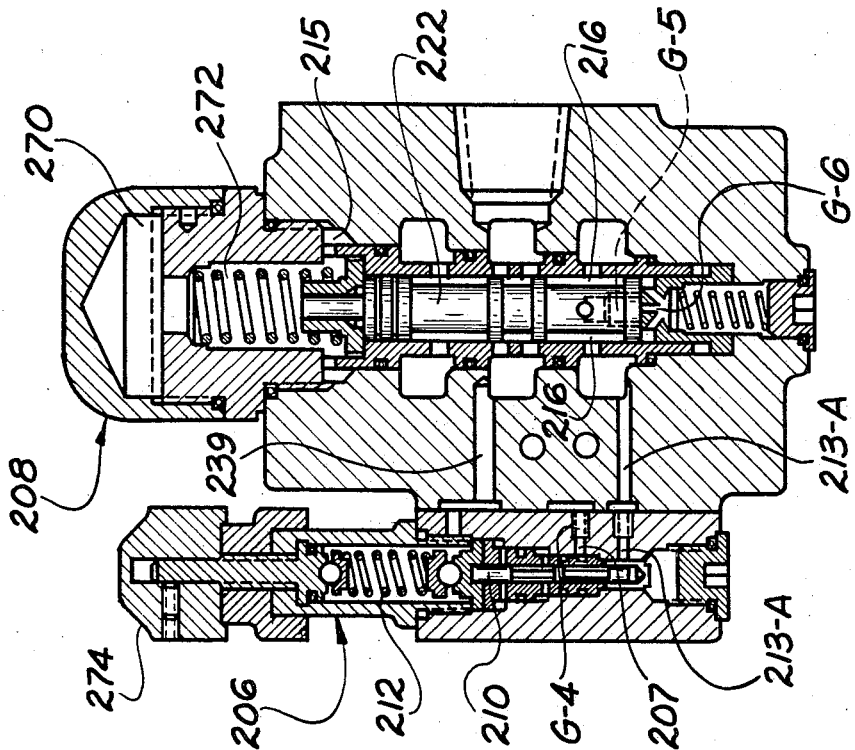
FIG. 7 is a front sectional elevational view of the apparatus illustrated in FIG. 1 the section being taken along the centerline of the apparatus illustrated in FIG. 1.
Figure 8:
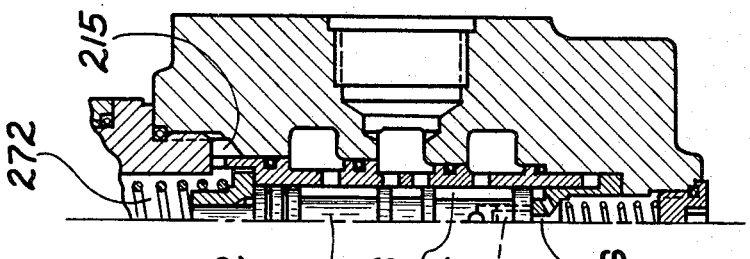
FIG. 8 is a right side elevational sectional view of the apparatus illustrated in FIG. 1, the section being taken along the centerline of the apparatus in FIG. 1.
Figure 9:
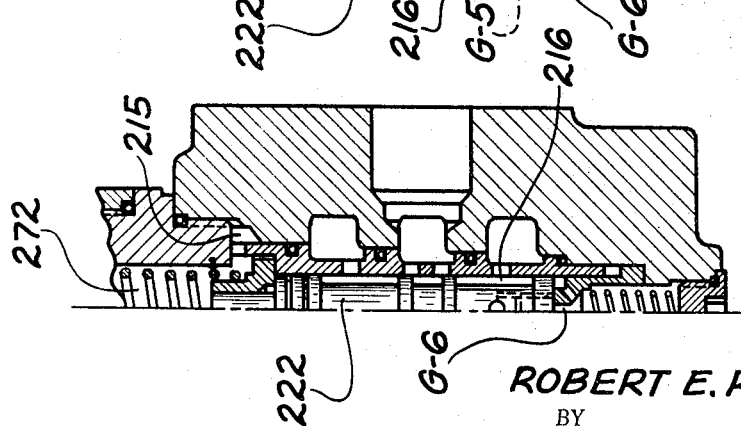
FIG. 9 is a left side elevational view of the apparatus illustrated in FIG. 1, the section being taken along the centerline of the apparatus in FIG. 1.
Figure 13:
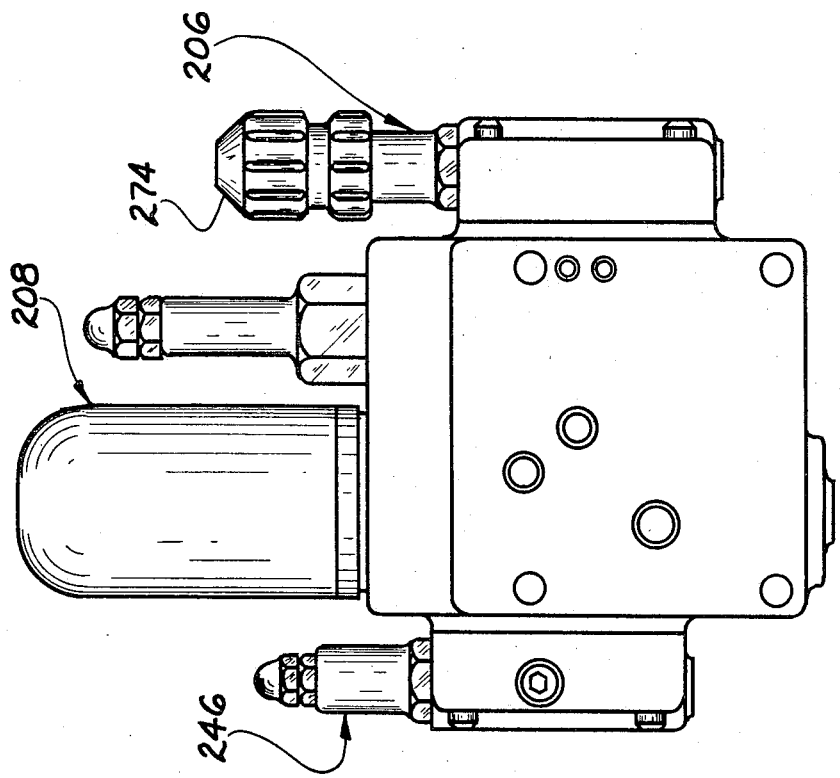
FIG. 13 is a rear elevational view of the control apparatus shown in FIG. 11.
Figure 12:
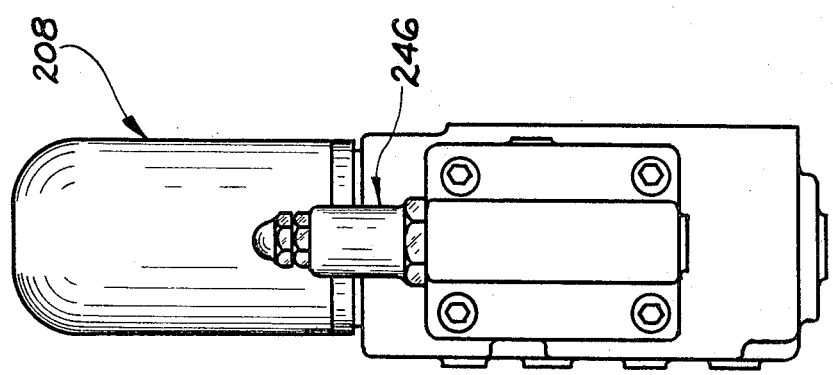
FIG. 12 is a right side elevational view of the control apparatus shown in FIG. 11.

Referring specifically to the drawings, a preferred embodiment of a pressure control apparatus constructed in accordance with the present invention is illustrated in FIGS. 1 through 10.

For purposes of simplicity and clarity, this embodiment of the present invention will be described with specific reference to the diagrammatic view shown in FIG. 10. The passages, orifices and elements referred to herein are given corresponding reference numerals in FIGS. 1 through 9 which illustrate a preferred construction of the control apparatus of the present invention.

Referring specifically to FIG. 10, output flow from a hydraulic pumping apparatus, indicated generally at 20–A, enters passage or line 213–A which leads to a detector valve, indicated generally at 206, which forms a portion of the pressure control apparatus, indicated generally at 204–A, of the present invention.

In the form shown in FIG. 10, pressure control apparatus 204–A is shown functioning as a pressure relief valve although it is understood that it may also perform other types of control functions in different systems, such as for example, a pressure governor, as illustrated and described later herein.

Detector valve 206 includes ports 230 and a movable valve element in the form of a spool 210 which in turn includes annular spool grooves 232, and 234.

Spool 210 is biased by a spring 212 which can be manually adjusted by a set screw 274 such that a variety of particular predetermined pressure values must be reached before spool 210 will move against the biasing force of spring 212.

Pressure control apparatus 204–A also includes a main power valve indicated generally at 208 which includes a movable spool element 222 which is biased by a relatively light spring 225. Spool 222 includes annular spool grooves 224 and 228.

Power valve 208 is provided with fluid chambers 220 and 272 disposed adjacent the ends of spool 222. The opposite ends of spool 222 provide control areas upon which fluid pressure in chambers 272 and 220 exert a force.

Chamber 272 is provided with an enlarged volume in the form of chamber 270 which is filled with oil and functions as a capacitive element in the operation of power valve 208, the function of which will be described in detail later herein.

Chamber 220 is provided with a check valve assembly formed by ball check valve 219 and spring 217.

The pressurized fluid from pump 20–A is directed to detector valve 206 via passage 213–A, an unrestricted orifice G1 and port 230. The pressure communicated to valve 206 represents a force acting downwardly on the upper end of spool 210 as viewed as FIG. 10.

When the detector valve 206 is in the closed position illustrated in FIG. 10, fluid from passage 213–A flows through ports 230 and annular spool grooves 232 and an orifice G4 into passage 207.

As the pressure in passage 213–A increases, the downward force exerted on the upper end of spool 210 increases until a particular predetermined pressure is reached which forces spool 210 downwardly against the biasing force of spring 212. This pressure which actuates spool 210 to move may be predetermined by the choice of the type of spring 212 and further it may be variably adjusted by manipulation of set screw 274.

As spool 210 moves downwardly the communication between lines 213–A and 207 is closed and annular spool groove 234 is communicated to spool outlet 237 which is connected with a passage 211–A.

Passage 213–A also communicates with spool land 234 through a restricting means in the form of restricted orifice G2 and passage 214. As spool 210 moves downwardly, passage 214 is communicated with passage 211–A to permit a flow to occur through orifice G2.

As flow occurs through orifice G2 a corresponding pressure drop occurs across orifice G2 which is reflected across spool 222 of power valve 208–A as described later herein.

The flow thruogh orifice G2 resulting in a pressure drop simply means that the pressure in line 214 is lower than the pressure in line 213–A.

Orifice G3 is a dampening orifice and on a slow rate of change of pressure basis, orifice G3 has no appreciable effect. Therefore passages 214 and 215 are essentially at the same pressure when the pressure in line 213–A changes at a relatively slow rate.

The pressure in line 215 is communicated to chamber 272 and to chamber 270 which are essentially at the same pressure as passage 215.

Passages 216 and 218 are essentially at the same pressure as passage or line 213–A as they are at the same point schematically and commuicate directly with passages 213–A.

The pressure in passage 213–A is communicated to chamber 220 through orifices G5 and G6 in passage 218 and through check valve 219 biased by spring 217 such that the sense of pressure from line 213–A is on the upper end, as viewed in FIG. 10 of spool 222.

Therefore it can readily be seen that the pressure differential across orifice G2 is essentially the same as the pressure differential between chamber 220 and chambers 270 and 272 and that pressure differential is reflected across spool 222 during slow rates of pressure changes in line 213–A.

As this pressure drop across orifice G2 increases, as measured by spring 225 in power valve 208, to a predetermined value, the spool 222 begins to move downwardly and communicates passage 216 to passage 226 through spool groove 224 and ports 227.

Passage 226 communicates to a tank or reservoir 209–A and therefore fluid from passage 213–A passing through passage 216 and valve 208 is dumped to tank when spool 222 moves to open passage 216 to passage 226.

Passage 211–A commuciates with either spool groove 224 or 228 and passage 226 such that the control flow from valve 206 through passage 211–A is always dumped to tank 209–A.

Therefore it is readily seen that as the pressure rises in line 213–A above a predetermined value and a predetermined pressure differential is present across spool 222, spool 222 moves downwardly as described and the pressure in line 213–A is relieved as flow is directed through passage 216 into passage 226 to tank.

When the pressure in line 213–A decreases, spool 222 is moved upwardly by the biasing force of spring 225 and the fluid pressure in chambers 270 and 272 to reduce communication between passage 226 and passage 216 through spool grooves 224 and 228 thereby lessening the flow through valve 208.

This reverse movement of spool 222 occurs because the decrease of pressure in line 213–A causes the spool 210 in detector valve 206 to move upwardly, as viewed in FIG. 10 to reduce the flow through orifice G2 which results in a smaller pressure differential across orifice G2. This smaller pressure differential is reflected in the same manner as previously described across spool 222.

In the limit, when the pressure in passage 213–A reduces to the predetermined value which permits spring 212 to move spool 210 of detector valve means 206 to completely close communication between passages 214 and 211–A which in turn prevents flow through orifice G2, spool 222 responds by completely closing communication between passages 216 and 226.

The foregoing description of the operation of control apparatus 204–A was described with reference to relatively slow rates of change in the pressure present in passage 213–A. However, when pressure in passage 213–A changes rapidly or in a high frequency sense the control apparatus of the present invention is capable of reacting quickly with much faster responses than prior pressure control apparatus.

First, if pressure rises rapidly in line 213–A, it is communicated to chamber 220 in valve 208 through orifice G5 and check valve 219 without much resistance as spring 217 which baising check valve 219 closed is relatively light. Therefore pressure changes in passage 213–A are communicated relatively quickly into chamber 220 and act on the upper end of spool 222.

Relatively however, flow is restricted considerably more through restricted orifices G2 and G3 and line 215 into chambers 270 and 272 on the lower end of spool 222.

A volume of oil in chamber 270 is connected to chamber 272 and provides a limited amount of resilience and capacitance. It should be pointed out that a spring-biased piston could replace oil volume 270 but an oil volume provides adequate capacitance under most circumstances.

During a rapid pressure change in passage 213–A then, it can be appreciated that the pressure in chambers 270 and 272 cannot be raised as quickly as the pressure in chamber 220 through the restricted path through orifices G2 and G3. This means that spool element 222 will move downwardly, as seen in FIG. 10, as if it were a solid column of oil to try to bring the pressure in chamber 270 and 272 up to the pressure in line 213–A.

Therefore spool 222 effectively is responsive to a pressure differential proportional to the rate of change of pressure in line 213–A in a direction to relieve the pressure in passage 213–A by communicating passage 216 to passage 226 and tank when spool 222 moves significantly.

It should be pointed out that since spool 222 is responsive to the rate of pressure change it will operate in advance of the pressure signal from detector valve 206 when the rate of change is occurring rapidly to relieve pressure and prevent the occurence of a large overshoot. This permits spool 222 to be more stable at the set pressure than prior art apparatus which are, in essence, only proportional to the pressure in the system being controlled and only react after the predetermined pressure value at which the pressure is desired to be controlled is reached. But on a rapidly changing basis this is too late to prevent a large overshoot from occurring.

The control apparatus 204–A also functions in the same manner in pressure rise circumstances as in pressure fall circumstances. The action of spool 222 being a "derivative control" or responsive to the rate of change of pressure in a negative feedback sense may be described as a "phase advance." This means simply that the spool may begin to move in a direction to relieve pressure before the set pressure is reached if the rate of pressure change is rapid enough to dictate that spool 222 must do so in order to prevent a significant overshoot of pressure in the system.

On the other hand, pressures generated by the action of valve 206 are not communicated quickly to spool 222 because of the high dampening action of restricted orifice G3.

In essence, pressure change in passage 214 is due to the action of spool 210 which may resonate or move at rather high frequency. However, this pressure is not communicated in a high frequency sense or rapid rate of change basis to chambers 270 and 272 because of dampening orifice G3.

The above description represents what might be referred to as essentially a resistance-capacitance filter network in passages 214 and 215 which means that spool 222 will not be responsive to the movement of detector valve 206 during rapid or high rates of change of pressure in passage 213–A but will be responsive during relatively slow rates of change of pressure in passage 213–A.

During high rates of change of the pressure in line 213–A, when the low resistance path through passage 207 is closed, spool 222 is essentially responsive only to the rate of pressure change in line 213–A since the pressure communicated to chambers 270 and 272 lags behind the pressure communicated to chamber 220.

As previously described, as pressure in passages 213–A rises rapidly, passage 216 is communicated to passage 226 by moving spool 222 into the oil volume in chambers 270 and 272, the oil volume functioning as a capacitive element. This is really a "derivative action" because the oil volume in chambers 270 and 272 measures the rate of change of the pressure in passage 213–A.

On the other hand, when the pressure in passage 213–A which is communicated to chamber 220 suddenly lowers, the fluid pressure in chambers 270 and 272 then is higher than the pressure in chamber 220 and therefore spool 222 is moved upwardly as viewed in FIG. 10.

However, as pressure in passage 213–A and hence chamber 220 drops, spool 222 cannot be returned instantly to its original starting position because of the throttling action brought on by check valve 219 responsive to spring 217 which restricts the rate of the upward movement, as shown in FIG. 10, of spool 222.

Since fluid cannot escape out of chamber 220 through check valve 219, it is forced to flow through restricted orifice G6 and subsequently through orifice G5 in series.

Therefore spool 222 is slower in its closing action than it is in its opening action and this aids in reducing shock and overshoot which occur in a fast closing valve. Also this gives spool 222 a stiff dampening characteristic upon closing which prevents spool 222 from going into high frequency vibration or "chatter" as referred to in the art.

It is important to point out that although spool 222 is restricted in its upward movement relative to its downward movement by the relatively low resistance on input through orifice G5 as compared to the relatively high resistance during output through restricted orifice G6, there is still derivative control both during pressure rise or during pressure fall in passage 213–A.

The volume of oil in chambers 270 and 272 still measures the rate of pressure change as pressure in passage 213–A falls and functions to make spool 222 react faster than it normally would if there were no significant capacitive element present.

It is important to point out that as the rate of pressure change in passage 213-A during a pressure drop increases, the capacitive effect of the volume of oil in chambers 270 and 272 generates higher forces to move spool 222 in the upward direction, as shown in FIG. 10, to close the communication between passages 216 and 209 more quickly than strictly conventional proportional control.

The check valve 219 and the higher resistance output path through orifice G6 merely act as a limit to the amplitude of oscillations in spool 222 which can be set up if the pressure changes at a rate which is so fast that spool 222 begins to "chatter."

It is also important to point out that the pressure across orifice G2 is very sensitive to rates of change of pressure in passage 213-A because the flow therethrough is not able to charge chambers 270 and 272 through orifice G3 without developing a pressure drop even when valve 206 is completely closed. Therefore the pressure in chambers 270 and 272 can only be equalized to the main pressure in passage 213-A by movement of spool 222, which is essentially the measurement of the rate of change of pressure, when chambers 270 and 272 must be charged through the relatively high resistance path through orifices G2 and G3.

However, since the pressure in chambers 270 and 272 drastically lags the pressure in passage 213-A, unless the pressure changes slowly enough that chambers 270 and 272 can be charged effectively through orifices G2 and G3, the purely derivative control action although very desirable and advantageous, could limit the actual theoretical possible rate of change of pressure in passage 213-A to an undesirable level when the capacitive effect of chambers 270 and 272 is sized to eliminate shock and overshoot. Therefore, control apparatus 204-A of the present invention is provided with what may be termed a dual gain feature which eliminates the above mentioned problem.

As shown in FIG. 10, the passage of fluid from line 213-A through orifice G1 is shown in valve 206 through a port 230 which has an area that is wider than the top land of spool 210. Therefore passage 213-A is directly communicated to passage 207 at all times until spool 210 moves downwardly against spring 212 responsive to the pressure on the upper end of the spool to a position wherein annular groove 230 no longer communicates with annular groove 232.

Line 207 communicates directly with line 215 or in effect provides a relatively open short circuit or low resistance by-pass around orifices G2 and G3.

Therefore when spool 210 is in the closed position shown in FIG. 10 with respect to flow orifice G2, chambers 270 and 272 can be charged directly through passage 207 from passage 213-A.

Spring 212 predetermines the set point pressure which must be present in 213-A before spool 210 moves downwardly to permit flow to occur through orifice G2. However, when spool 210 moves downwardly, the communication between passages 213-A and 207 through grooves 230 and 232 is closed. Therefore when the pressure in 213-A drops below said set point pressure of spring 212, spool 210 is returned upwardly again connecting grooves 230 and 232 and the direct flow through passage 207 charges chambers 270 and 272 to equalize the pressure in chamber 220 so that spool 222 does not move.

Hence the pressure drop across spool 222 does not get to the critical value where it must move to equalize pressure in chambers 270 and 272 until some predetermined pressure is reached in passage 213-A which, in the embodiment shown in FIG. 10, is the set point pressure of spring 212 of valve 206.

When the pressure in passage 213-A reaches the set point pressure required to move spool 210 downwardly against spring 212, the communication between passages 213-A and 207 begins to close and when completely closed, chambers 270 and 272 can only be charged through the relatively high resistance path through orifices G2 and G3.

When this high resistance path to chamber 270 and 272 is re-established, spool 222 becomes readily responsive to the rate of change of pressure in passage 213-A in the manner previously described.

From the above description, it is readily seen that the foregoing description of what is termed "dual gain" provides control whereby a rapid rise in pressure in line 213-A is permited at any point below a predetermined pressure control band without triggering a response in valve 208. When the pressure in passage 213-A reaches this pressure control band, valve 208 is rendered readily responsive to changes in pressure.

In essence the novel pressure control apparatus provides a highly responsive, very sensitive control apparatus at any predetermined desired level of pressure which is also non-responsive to pressure changes below the desired level of control.

It is important to emphasize that the ratio of the resistance to the capacitance on the lower side of spool 222 determines the responsiveness of spool 222 to pressure rate changes.

Also, control apparatus 204-A detects both positive and negative rates of change of pressure as well as being proportional to pressure. Further, control apparatus 204-A includes means for controlling or switching the ratio of resistance to capacitance in the system to make valve 208 more or less responsive to the high frequency or rapid rates of change of pressure in the system being controlled.

It is also important to understand that the control apparatus of the present invention permits a wide variety of control applications because the choice and design of capacitive elements, chambers 270 and 272, and the resistances G2 and G3 and, even G4 in passage 207, permits a wide choice in varying the responsiveness of the control apparatus.

For example, to eliminate shock and overshoot in spool 222, the volume of chamber 270 could be increased to obtain a more capacitive effect such that very low pressure differences would receive the complete spool movement into the oil volume in chamber 270 and 272. Spool 222 would then be very sensitive and responsive such that relatively small presure changes would trigger a relatively high degree of movement or "gain" in spool 222. On the other hand lowering the capacitive effect by reducing the oil volume would render spool 222 less sensitive thereby requiring relative high pressure changes to move the spool only a short distance.

Also the resistances offered by orifices G2, G3, or G4 can be adjusted so that the time constant effect on the rate of pressure change may be varied.

Referring now to FIGS. 11-16, another embodiment of the present invention is illustrated wherein pressure control apparatus 204 functions as a pressure governor or main controller valve for sending a flow signal to another valve.

It is important to point out that other types of valve could be substituted for the valve 202 shown and described herein without departing from the spirit of the present invention.

The passages, elements and orifices illustrated in the embodiment shown in FIGS. 11-16 which are identical with those shown in the embodiment of FIGS. 1-10 are indicated by the same reference numbers less the subscript A.

The basic difference between the operation of the embodiments of FIGS. 1-10 and FIGS. 11-16 is that passage 226 is connected to tank in the relief valve operation whereas passage 226 is connected to another valve means 202 in the pressure governor application.

Further, spool 222 acts as a three-way power valve in the embodiment shown in FIGS. 11-16 because valve 202 is sending a signal to a pump displacement control mechanism which is vented back to a reservoir. In the relief valve function, a three-way valve action is not necessary because spool 222 need only function on a two-way action, either open or closed, although the three-way action can be used if desired.

Referring specifically to the diagrammatic view of FIG. 16, pressure control apparatus 204 again includes a detector valve 206 and a power valve 208.

The operation of control apparatus 204 is essentially the same as described previously in the embodiment of FIGS. 1–10 with the exception that the control flow from valve 206 now leaves a passage 211 which communicates with a restricted orifice G7 in valve means 202 and passage 226 communicates the control flow passing through valve 208 to valve 202 to actuate displacement control cylinders 150–A and a priority valve 246.

Valve means 202 is a priority control means for selectively controlling the actuation of control pistons in a multiple cartridge pumping apparatus and is described in detail in my co-pending application Serial No. 605,808, filed Dec. 29, 1966, and therefore will not be described in detail herein.

In operation, a variable pumping apparatus indicated generally at 20 sends an output flow to line 116. A passage 213 communicates with the output 116 and passage 213 communicates with detector valve 206 through orifice G1 and port 230.

In general, the pressure in line 213 communicated to the upper end of spool 210, as viewed in FIG. 16, actuates spool 210 to move downwardly against biasing spring 212 to permit fluid to flow through orifice G2, passage 214, and annular groove 234 into passage 211.

As flow occurs through orifice G2, the resulting pressure drop across orifice G2 is reflected across spool 222 in the manner previously described in the embodiment of FIGS. 1–10 when the pressure in passage 213 is changing at a slow rate.

The pressure differential reflected across spool 222 as represented by the pressure differential between upper chamber 220 and lower chambers 270 and 272 actuate spool 222 to open communication between passage 216 and 226 via spool groove 224 to permit a fluid to flow from passage 213 to valve means 202.

If pressure in passage 213 changes rapidly above the set pressure of valve 206, spool 222 also responds quickly in the manner previously described since pressure cannot be communicated quickly to chamber 270 and 272 through the restricted path through orifices G2 and G3.

If the pressure in passage 213 changes rapidly at any value below the set pressure required to move spool 210 downwardly, spool 222 is not responsive because the pressure in passage 213 is communicated directly to chambers 270 and 272 through ports 230 and annular groove 232 and passages 207 and 215.

Therefore it is understood that the "dual gain" and high response characteristics are present in the embodiment of FIGS. 11–16 in the same manner as previously described in the embodiment of FIGS. 1–10 and these characteristics are equally advantageous whether the control apparatus of the present invention functions as a pressure relief valve or as a pressure governor for controlling another type of valve.

The oil volume in chambers 270 and 272 measures the rate of change of pressure in passage 213 when the only communication between said chambers is through the relatively high resistance path through orifices G2 and G3. The spool 222 will move into the volume of oil in chambers 270 and 272 until the forces acting on each end of the spool are substantially equal.

And conversely, when the pressure in passage 213 drops, hence a corresponding pressure drop in chamber 220, the fluid pressure in chambers 270 and 272 urges spool 222 upwardly much faster than the conventional prior art apparatus which do not provide a significant capacitive feature or "derivative control" separate from the spool element itself.

The rate of return of spool 222 is retarded in the same manner as previously described in embodiment of FIGS. 1–10 by check valve 219 and spring 217 so that spool 222 will not go into a "chatter" upon rapid rates of pressure change.

It should also be understood that the capacitive element and the resistances can be designed to vary the ratio of the resistance to capacitance in the system as desired to obtain more or less sensitive response to the rates of pressure change.

Figure 17:
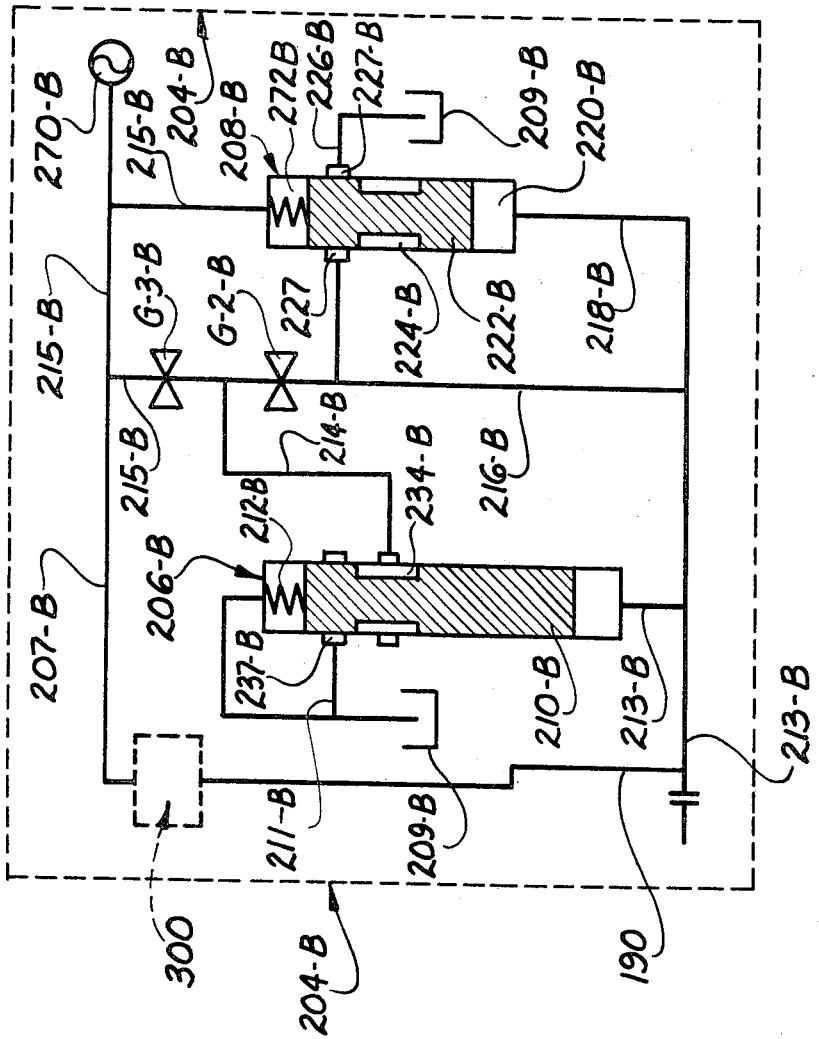
FIG. 17 is a diagrammatic view of still another embodiment of a control apparatus constructed in accordance with the present invention.

Another embodiment of the present invention is illustrated in the diagrammatic view of FIG. 17 and indicated generally at 204–B.

The basic difference between the embodiment diagrammatically illustrated in FIG. 17 and the previously described embodiments is that a separate conventional general control valve 300 is utilized to control flow through passage 207–B which is analogous to the low resistance path 207 described previously.

In the embodiments previously described, spool 210 includes porting grooves wherein spool 210 functioned both as a detector valve and also integrally formed shutoff valve to close the low resistance path through passage 207 when opening a path through orifice G2.

The advantage of controlling the flow through orifice G2 and through passage 207 with the same valve element is that the pressure required to close passage 207 and open communication through groove 234 for the control flow is controlled in a positive manner. Whereas, if the valve for closing passage 207 is independent or remote from valve 206, and it is desired that the closing of one correspond with the opening of the other, there is a mechanical limitation in exactly controlling each to act in unison. This is not true when both paths are controlled positively by the same valve element.

On the other hand, an independent valve for controlling flow through passage 207 or its equivalent obviously permits the pressure required to close passage 207 to be some predetermined value independent from the pressure required to actuate valve means 206.

It is important to point out that the fluid pressure supply for passage 190 or its equivalent may originate from any source if desired or may be connected to passage 213–B as shown in FIG. 17. This same principle is also true from the embodiments shown in FIGS. 1–16.

In the description of pressure control apparatus 204–B, the passages, elements and orifices or restricting means analogous to those described in the embodiments illustrated in FIGS. 1–16 are referred to by the same reference numerals but suffixed with the letter B.

Detector valve 206–B communicates with passage 213–B which may be connected to a source of fluid pressure such as a hydraulic pump, not shown.

The pressure in passage 213–B acts on the lower end of spool 210–B, as viewed in FIG. 17, against the biasing force of spring 212–B and, at some pressure value predetermined by the biasing force of spring 212–B, moves spool 210–B upwardly to an open position to communicate passage 214–B to passage 211–B via annular groove 234–B and ports 237–B. This action permits a flow to occur from passages 213–B and 216–B through restricted orifice G2 into a reservoir 209–B via passages 214–B and 211–B.

Flow occurring through restricted orifice G2–B results in a pressure drop, therefore the pressure in passages 213–B and 216–B is higher than the pressure in 214–B.

When the pressure in passage 213–B is changing at a slow rate, the pressure in passage 214–B is essentially equal to the pressure in passage 215–B and damping orifice G3–B has substantially no effect.

Passage 215–B communicates with a fluid chamber 272–B in power valve 208–B and with an oil volume in chamber 270–B which functions as a capacitive element in the apparatus.

Valve 208-B includes a spool 222-B provided with an annular groove 224-B, inlet and outlet ports 227 and 227-B and another fluid chamber 220-B which communicates directly through passage 218-B with passage 213-B.

Fluid pressure in chamber 272-B and 270-B and 220-B act on opposing control areas on spool 222-B and pressure differentials between chamber 220-B and chambers 272-B and 270-B actuate the movement of spool 222-B.

Spool 222-B is represented as a simple two-way acting valve, between an open and closed position, since the embodiment shown in FIG. 17 is functioning as a relief valve. However, it should be pointed out that a three-way acting valve spool such as shown and described previously herein could be substituted without departing from the spirit of the present invention.

The communication of fluid pressure through orifices G2-B and G3-B and passage 215-B described above represents a relatively high resistance path for charging chambers 270-B and 272-B in order to equalize the pressure on each end of spool 222-B.

The relatively low resistance path for charging chambers 270-B and 272-B is represented by passages 190 and 207-B, a shut-off valve 300, and passage 215-B. Valve 300 may be set to close at some predetermined pressure either lower or higher or equal to the set pressure required to open valve 206-B.

It is important to point out that in the embodiment of FIG. 17, valve 300 may take the form of any type of conventional controller valve to open or close the low resistance path for charging chambers 270-B and 272-B without departing from the spirit of the present invention.

In operation, pressure is communicated from passage 213-B to valve 300 via passage 190.

For descriptive purposes assume valve 300 is designed to close at some pressure value P-1, for example, below some set pressure P-2 required to actuate spool 210-B to move against spring 212-B.

When valve means 300 is open, and valve 206-B is closed as shown in FIG. 17, fluid pressure from passage 213-B is communicated directly to chambers 270-B and 272-B via passages 190, 207-B and 215-B.

At the same time, pressure in passage 213-B is present in chamber 220-B via passage 218-B.

Therefore, spool 222-B is not responsive to changes in pressure in passage 213-B when valve means 300 is open as the pressure on each end as spool 222-B is essentially equal because the pressure in passage 213-B is being communicated directly to both ends of spool 222-B.

However, when the pressure in passage 213-B is higher than pressure P-1 but lower than the pressure P-2, chambers 270-B and 272-B must be charged through the relatively high resistance path through orifices G2 and G3.

Therefore spool 22-B is readily responsive to pressure changes in passage 213-B and moves to open communication between passage 216-B and 226-B via groove 224-B and dump fluid to tank.

When the pressure in passage 213-B is higher than P-2, then valve 206-B is actuated to amplify pressure changes in passage 213-B on a slow rate of change basis and the pressure drop is reflected across spool 222-B in the same manner as described in the previous embodiments.

In essence, locating valve 300 remote from valve means 206-B permits one to choose at what pressure the low resistance path becomes closed such that valve 208-B becomes readily responsive to pressure changes in passage 213-B independent from the actuating pressure of valve 206-B.

This is important in that this permits rapid rates of change to take place in passage 213-B at any pressure below the set pressure required to close valve 300 without triggering a response from valve 208-B until some certain predetermined pressure value is reached.

At this predetermined pressure value, valve 208-B then becomes a highly responsive valve for controlling the desired pressure. When valve 300 is open, of course, spool 222-B in valve 208-B is non-responsive to the rate of pressure changes in passage 213-B because pressure from passage 213-B may be communicated directly to chambers 270-B and 272-B via the relatively low resistance path of passages 190, 207-B and 215-B.

Again as in the previously described embodiments, the ratio of the resistances G2-B and G3-B to the capacitance of the oil volume in chambers 270-B and 272-B determines the responsiveness of spool 222-B to the rate of pressure change.

Also it is pointed out that the presence of the capacitive element, shown herein as an enlarged volume of oil in chamber 270-B communicating with chamber 272-B, permits the spool 222-B to be more rapidly responsive to pressure rate changes than if no appreciable capacitive element were used. With a significant capacitive element, the resistances to flow into the chamber 272-B can be adjusted such that valve 208-B is very responsive to pressure changes. Then the "dual gain" aspect of the control apparatus, whereby the parallel paths of low and high resistance which communicate with chambers 270-B and 272-B can be automatically "switched in," to permit selectivity in choosing at what pressure one desires to actuate this highly responsive control valve.

Further, the high and low resistance paths which communicate with chambers 270-B and 272-B may simply take the form of two parallel passages each having the same size orifice for example. The low resistance path would then be represented by both passages communicating with the oil volume and the high resistance path would be represented by only one passage communicating with the oil volume which would in effect offer twice the resistance as both passages combined.

It should be pointed out that although a check valve such as check 219 was not included in the description of the embodiment of FIG. 17, it of course could be included and would function in the same manner as previously described to obtain the same result.

While the forms of embodiments of the present invention as herein disclosed constitute preferred forms, it is to be understood that other forms might be adopted, all coming within the scope of the claims which follow.

I claim:

1. In a pressure control apparatus the combination of a source of fluid pressure; detector valve means communicating with said source and including a valve element movable between an open and closed position responsive to a predetermined pressure for drawing a first control flow of fluid; power valve means including an inlet port and an outlet port, a valve element provided with opposing control areas, a first fluid chamber communicating with one of said control areas and with said source, a second fluid chamber communicating with the other of said control areas, said last-mentioned valve element being movable between open and closed positions responsive to a pressure differential between said first and second chambers for delivering a second control flow of fluid; a high resistance passage communicating said source with said detector valve means and with said second chamber; a low resistance passage communicating said source with said second chamber; and valve means for controlling the flow of fluid through said low resistance path.

2. The apparatus defined in claim 1 wherein said high resistance path includes restricting orifice means to resist the communication of pressure change to said second chamber from both said source and said detector valve means.

3. The apparatus defined in claim 1 including means for restricting the rate of movement of said valve element in said power valve means toward said closed position.

4. The apparatus defined in claim 1 wherein said first fluid chamber communicates with said source through a third passage means, said third passage means including a high resistance portion and a low resistance portion; and check valve means communicating with said low resistance portion to prevent fluid flow out of said first fluid chamber through said low resistance portion.

5. In a pressure control apparatus the combination of of a source of fluid pressure; detector valve means communicating with said source and movable between open and closed positions responsive to a predetermined fluid pressure for drawing a first flow of fluid from said source; power valve means including a first fluid chamber and a second fluid chamber disposed in opposing relationship to said first fluid chamber, said power valve means being movable between an open and closed position responsive to a pressure differential between said fluid chambers which is proportional to the rate of change of pressure in said source for delivering a second flow of fluid; a first passage means commuicating said first fluid chamber with said source; a second passage means communicating with said second fluid chamber, with said source and with said detector valve means; and restricting means disposed in said second passage means and responive to said first flow of fluid through said detector valve means to create a pressure differential between said first and second fluid chambers in said power valve means.

6. The apparatus defined in claim 5 including third passage means by-passing said restricting means and communicating said source directly to said second fluid chamber; and by-pass valve means responsive to a predetermined pressure for closing said third passage means.

7. The apparatus defined in claim 5 wherein said first passage means includes a first portion and a second portion, said second portion including means for resisting the flow of fluid out of said first chamber; and wherein said first chamber includes check valve means communicating with said first portion of said first passage means to prevent the flow of fluid from said first chamber into said first portion of said first passage means.

8. The apparatus defined in claim 5 wherein said second passage means includes a first portion communicating said source to a first detector valve inlet; a second portion communicating said source with a second detector valve inlet and with said first portion, and a third portion communicating with said source, with said second portion and with said second fluid chamber; and wherein said restricting means includes a first orifice resisting fluid flow from said source to said second detector valve inlet and a second orifice resisting fluid flow from said second portion to said second fluid chamber.

References Cited

UNITED STATES PATENTS

| | | | |
|---|---|---|---|
| 2,203,243 | 6/1940 | Wettstein | 137—488 |
| 2,477,247 | 7/1949 | Haberland | 137—488 |
| 2,649,115 | 8/1953 | Deardorff | 137—488 |
| 3,007,492 | 11/1961 | Grimmer | 137—488 XR |
| 3,083,726 | 4/1963 | Woelfel | 137—488 XR |

HENRY T. KLINKSIEK, *Primary Examiner.*

U.S. Cl. X.R.

137—596, 596.18